United States Patent [19]

Dundas

[11] Patent Number: 4,962,831
[45] Date of Patent: Oct. 16, 1990

[54] APPARATUS FOR CONTROLLING LUBRICATING OIL FIRES DUE TO OIL LINE FAILURE

[75] Inventor: Robert E. Dundas, Duxbury, Mass.

[73] Assignee: Factory Mutual Research, Norwood, Mass.

[21] Appl. No.: 407,304

[22] Filed: Sep. 14, 1989

[51] Int. Cl.⁵ .............................................. F01M 1/18
[52] U.S. Cl. .................................... 184/108; 184/6.4; 184/107; 184/6.11; 137/498; 200/82 E; 340/679; 340/686; 417/13
[58] Field of Search .................. 184/6.1, 6.4, 6.11, 184/6.25, 7.4, 39.1, 107, 108; 251/16; 137/498, 460; 200/82 E; 340/679, 605, 686; 417/13; 60/39.08

[56] References Cited

U.S. PATENT DOCUMENTS

| | | | |
|---|---|---|---|
| 2,502,318 | 3/1950 | Fischer | 184/6.4 |
| 2,583,295 | 1/1952 | Greer et al. | 251/16 |
| 2,750,956 | 6/1956 | Stevenson | 137/460 |
| 3,109,448 | 11/1963 | Berglund | 137/460 |
| 3,500,958 | 3/1970 | Callahan et al. | 184/6.4 |
| 3,766,779 | 2/1982 | Hoffman | 200/82 E |
| 3,896,280 | 7/1975 | Blake | 200/81.9 |
| 4,223,692 | 9/1980 | Perry | 137/78.4 |
| 4,297,687 | 10/1981 | Fuzzell | 340/626 |
| 4,467,892 | 8/1984 | Van de Bogert | 184/6.1 |
| 4,574,920 | 3/1986 | Callahan et al. | 184/39.1 |
| 4,674,030 | 6/1987 | Gabriel et al. | 184/6.4 |
| 4,847,599 | 7/1989 | Imiolex et al. | 340/605 |

OTHER PUBLICATIONS

"Excess Flow Valves", Chem-Tec Equipment Company, 1 sheet.

Primary Examiner—Ira S. Lazarus
Assistant Examiner—Alan B. Cariaso
Attorney, Agent, or Firm—Lane, Aitken & McCann

[57] ABSTRACT

Fires caused by the leakage of lubricating oil spraying under pressure from lubricating oil conduits feeding bearings are controlled by stopping the flow of the lubricating oil in response to greater than normal flow of the oil through the conduit and simultaneously shutting down the machine having the bearing to which the oil is fed. A valve mounted in each conduit includes a valve element movable in response to the greater than normal flow through the conduit from a first position, to which it is biased and in which it is spaced from a valve seat, to a second position in which it engages the valve seat. A magnet mounted on the valve element actuates a magnetically operated switch connected in a circuit for shutting down the machine when the valve element moves at least part way from the first position to the second position. An alarm is activated as the machine is being shut down.

24 Claims, 3 Drawing Sheets

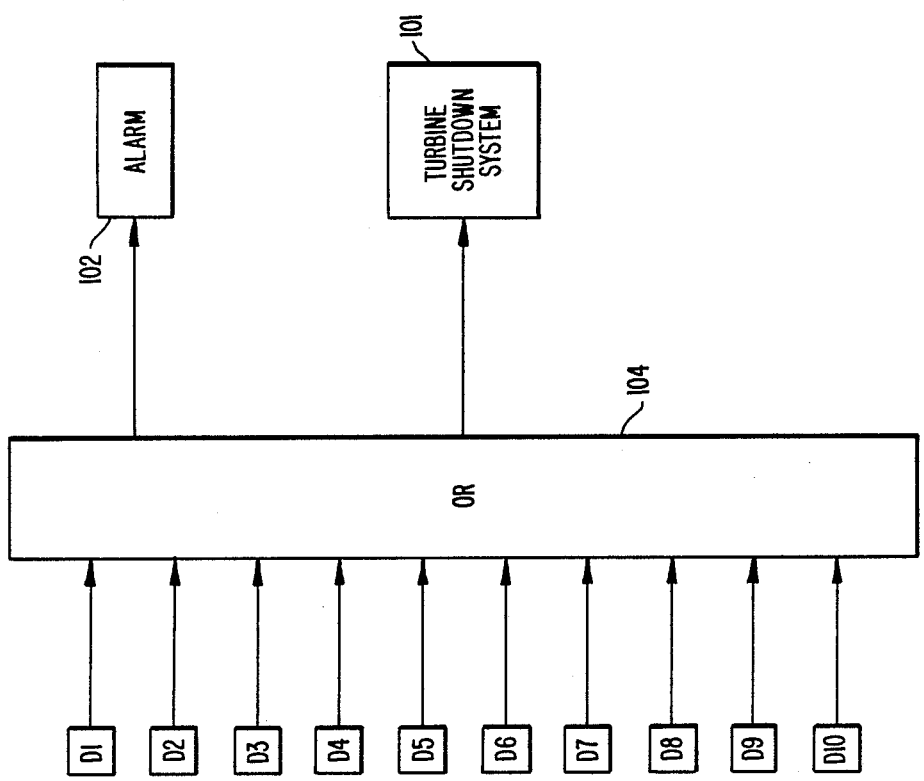

APPARATUS FOR CONTROLLING LUBRICATING OIL FIRES DUE TO OIL LINE FAILURE

BACKGROUND OF THE INVENTION

The present invention relates to a device for controlling fires and, more specifically, to a device for preventing lubricating oil fires resulting from the fracture or separation of an oil line at the bearing of a machine having a pressurized lubricating system.

The hazard of lubricating and hydraulic oil fires in electric generating stations has been of concern for many years. In 1964 the National Fire Protection Association published a pamphlet on fires in electric generating plants and highlighted three fires involving the spray of oil from broken oil lines. The total loss, in 1988 dollars, was $15,000,000. The inventor is aware of twenty-four fires of this type between 1951 and 1988, with a total estimated loss of $125,000,000. Many of the fires burned until the lubricating oil was able to be shut off or its supply was exhausted. By the time the cause of the fire was determined and the spraying of oil from the failed oil line was able to be stopped, damage of many millions of dollars had already occurred.

In pressurized lubrication systems, such as those used for steam and gas turbines, internal combustion engines, and rotating and reciprocating compressors, lubricating oil is delivered to the bearings at pressures of up to 35 psig. The flow to each bearing is controlled by a metering orifice in the bearing housing. This orifice reduces the pressure of the lubricating oil to atmospheric pressure in the bearing area.

Lubricating oil fires often occur around the systems described above as a result of the fracture of an oil pipe to a bearing or the separation of such an oil pipe from its connections. The oil under pressure sprays out at the point of failure in a fine mist, which is readily ignited by adjacent hot surfaces or by other mechanisms. The resulting fire is torch-like, with a very high rate of heat release, such that the fire may ignite or overheat building structure and contents up to sixty feet away from the point of spray origin.

Water sprinkler discharge, or even water spray discharge directly on the oil pipe at the point of oil release, is known to be ineffective in extinguishing or controlling such fires. Water may limit the damage caused, by cooling the target material or structure, if the water can be directed properly. The only effective extinguishments have been total-flooding agents, such as the Halons, and carbon dioxide. However, the use of these agents requires that the machinery protected from the fire be enclosed in a housing which can be sealed off to retain the necessary concentration of the extinguishing agent for as long as there is a danger of reignition. This is not usually practical, other than for some gas turbine installations.

Oil-spray fires of the type described above are very similar to leaking gas fires in that the principal approach to the extinguishment of both such fires is to shut off the flow of the flammable fluid. However, in most installations affected by oil-spray fires, auxiliary oil pumps continue to pump oil to the bearings of the machinery after the machine is tripped off line. The problem here is that the oil lines in which the failures occur supply the bearings of huge and very expensive steam turbines rotating at very high speeds. The lubricating oil cannot simply be cut off to stop the fire, since very extensive damage is likely to occur as a result of the failure of the bearings and the damage that the failure of the bearings would have on the spinning turbines. Therefore, the flow of oil is maintained to protect the bearings while the machine is coming to a stop and, in the case of large steam and gas turbines, after it has been put on turning gear for slow rotation during cooldown.

SUMMARY OF THE INVENTION

By the present invention, the emission of an oil spray from a pressurized oil line feeding a bearing is shut off instantaneously upon the failure of the line in order to control and perhaps even prevent any fire from the emission of the oil spray from the line. The apparatus according to the present invention also minimizes damage to the bearings and prevents consequent damage to the machine due to oil starvation by instantaneously shutting down the machine.

A significant problem in attacking fires of this type—the delay in recognition by the machine operators that the fire is being caused by the spray of oil from a ruptured or separated oil line—is avoided by the instantaneous actuation of the apparatus according to the present invention to shut off the oil flow in the affected line in response to the reduction in line pressure downstream of the apparatus. A device for stopping the flow of lubricating oil and simultaneously shutting down the machine is positioned in each line, or conduit, feeding lubricating oil to a bearing of the machine. The device comprises a valve defining a coupling having a first coupling member secured to a first portion of a pressurized lubricating oil line and a second coupling member connected between the first coupling member and a second portion of the pressurized lubricating oil line. A piston of non-magnetic material is slidably mounted in a sleeve in the first coupling member and normally biased to a position allowing the lubricating oil to flow from the first portion, through the device, and into the second portion. The piston includes a valve surface, and the second coupling member has a valve seat spaced from the valve surface to permit the flow of lubricating oil therebetween during normal operating conditions. The piston is responsive to a decrease in the downstream pressure due to a break or separation in the second portion of the lubricating oil line and an associated greater than normal flow through the line to move into a seated position in which the valve surface sealingly engages the valve seat and thereby prevents further flow of lubricating oil through the device. Thus, a break or separation in the lubricating oil line results in the cessation of the flow of lubricating oil through the device and, therefore, to the point of break or separation.

A magnetically operated switch, such as a reed switch, is mounted on the second coupling member adjacent the path of movement of the piston. A permanent magnet is mounted on the piston in a place adjacent the magnetically operated switch, the magnet moving with the piston from a normal operating position in which the magnet does not influence the magnetically-operated switch to a position causing the actuation of the magnetically-operated switch when the piston reaches a position at least part way toward the seated position. The switch is connected in a circuit for controlling the shutting down of the machine, whereby actuation of the switch causes activation of the control circuit to shut down the machine. Actuation of the switch also activates an alarm in a control room so that the machine operators will immediately know what has happened.

BRIEF DESCRIPTION OF THE DRAWINGS

FIG. 3 is a block diagram of an arrangement for tripping a turbine off line in response to the actuation of a lubricating oil device according to the present invention.

DETAILED DESCRIPTION OF THE PREFERRED EMBODIMENTS

Figure 1:
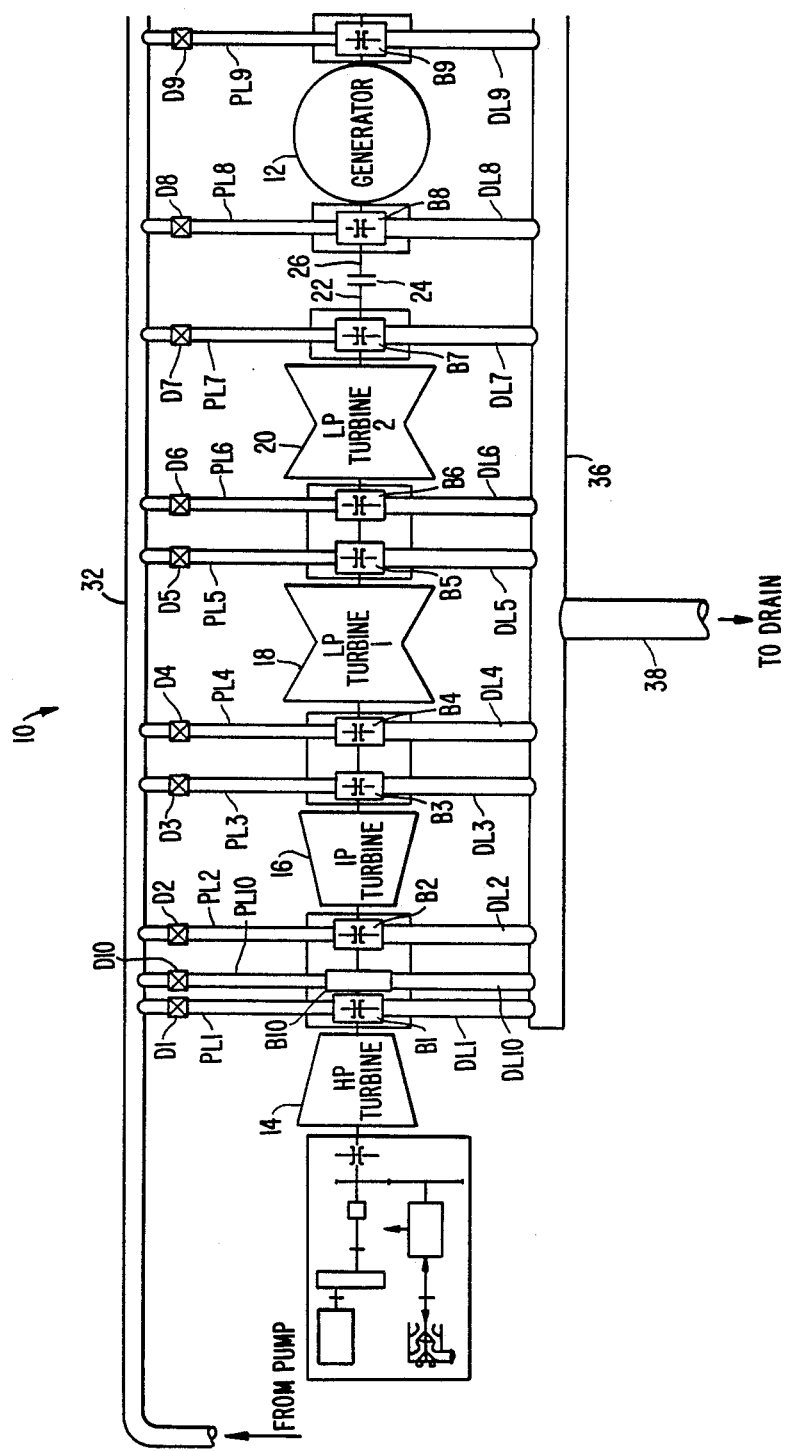
FIG. 1 is a schematic illustration of a lubricating oil distribution system for a steam turbine including a plurality of lubricating oil fire control devices according to the present invention.

As can be seen from FIG. 1, a steam turbine and generator arrangement, which is designated generally by the reference numeral 10, includes a generator 12 and a steam turbine including a high pressure turbine section 14, an intermediate pressure turbine section 16 and low pressure turbine sections 18 and 20. All of the steam turbine sections 14, 16, 18 and 20 are mounted on a common shaft 22, which is connected by a coupling 24 to a shaft 26 on which the generator 12 is mounted. A plurality of bearings B1-B9 support the turbine shaft 22 for rotation, bearings B1 and B2 being positioned between the high pressure turbine section 14 and the intermediate pressure turbine section 16, bearings B3 and B4 being positioned between the intermediate pressure turbine section 16 and the first low pressure turbine section 18, bearings B5 and B6 being positioned between the two low pressure turbine sections 18 and 20, and a bearing B7 being positioned between the second low pressure turbine section 20 and the coupling 24. Bearings B8 and B9 are provided to support the generator 12 for rotation. In addition, a thrust bearing B10 is positioned around the turbine shaft 22 between the bearings B1 and B2. Each of the bearings B1-B10 are lubricated by lubricating oil fed under pressure through individual pressure conduits or lines PL1-PL10 associated with the bearings B1-B10, respectively. The individual pressure lines extend from a pressure header 32 which receives lubricating oil under pressure from a pump (not shown). Individual lubricating oil drain lines DL1-DL10 are associated with the bearings B1-B10, respectively. The individual drain lines are connected to a drain header 36 from which a drain 38 leads to the inlet of the lubricating oil pump. In normal operation, lubricating oil fed under pressure from the pump flows through the pressure header 32, through the individual pressure lines PL1-PL10, and through the bearings B1-B10 for lubrication purposes. The lubricating oil then flows out of the bearings through the individual drain lines DL1-DL10, through the drain header 36 and the drain 38 to be recirculated by the pump.

A metering orifice (not shown) is positioned at the inlet to each bearing B1-B10 to reduce the pressure of the lubricating oil to atmospheric pressure at the bearing area, as is known in the art. The orifices are also the cause of back pressure between the bearings and the lubricating oil fire control devices D1-D10 positioned in the lubricating oil pressure lines PL1-PL10, respectively. A fracture or separation of a lubricating oil line usually results in a spray of the oil, which is flammable, and since there are so many hot surfaces near by, the oil spray is likely to ignite, starting a fire. A fracture or separation in any of the pressure lines PL1-PL10 downstream of its associated lubricating oil fire control device D1-D10 results in a greater than normal flow of oil through the line, a decrease in the back pressure caused by the associated orifice, and a consequent increase in pressure differential across the control device. As will be described more specifically hereinafter, the increased pressure differential causes the control device to shut off the flow of lubricating oil in its pressure line and, thereby, stop the supply of combustible material for the fire. Since lubricating oil control devices are associated with each of the pressure lines feeding the individual bearings, the lubricating oil flow in only the failed pressure line, and, therefore, the lubricating oil feed to only one bearing, will be stopped. The lubrication system will continue to provide oil to the remaining bearings. Thus, the likelihood of significant damage to the turbine or generator as a result of bearing failure is small. Furthermore, simultaneous with the stopping of the lubricating oil flow, the affected control device shuts down the turbine so that even a bearing whose lubricating oil supply has been cut off may avoid damage.

Figure 2:
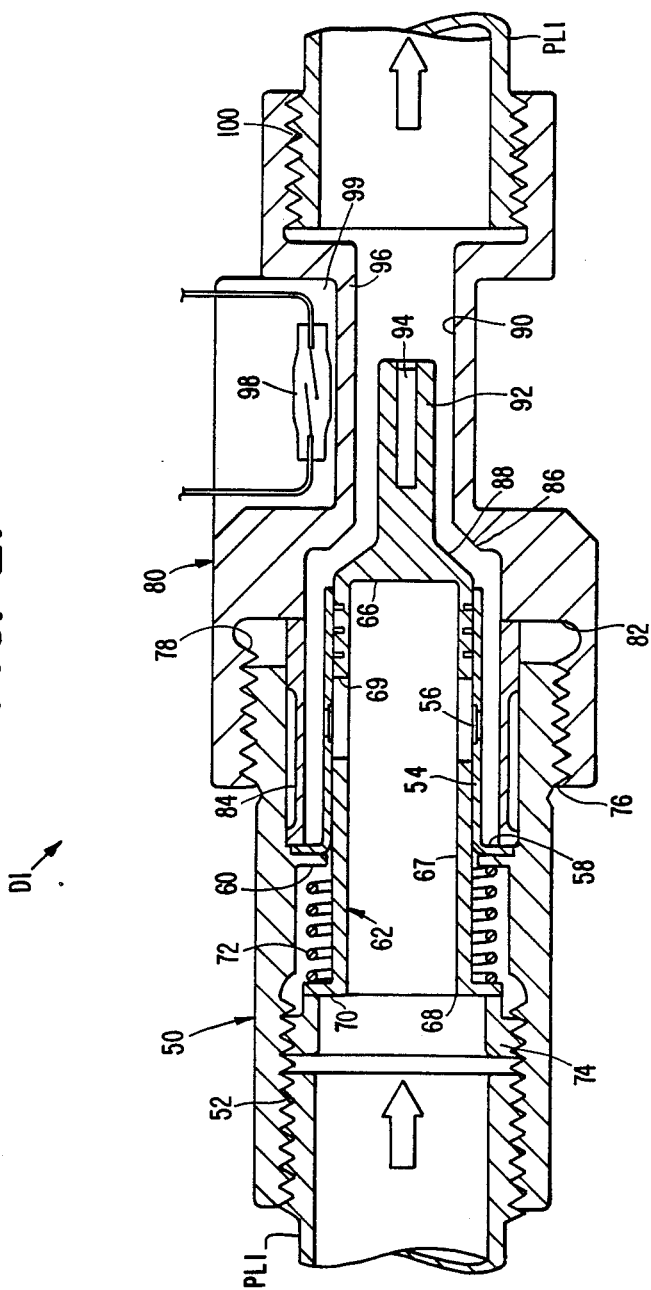
FIG. 2 is a cross-section of a lubricating oil fire control device according to the present invention.

Each of the control devices D1-D10 comprises a valve of a type which can be called a velocity fuse, the valve defining a coupling, as can be seen from FIG. 2, which is a cross section of one of the control devices, for example, control device D1. It is understood that the other control devices D2-D10 can have the same structure. The control device D1 includes a first coupling member 50 having threads 52 for connecting the first coupling member to mating threads on a portion of the lubricating oil pressure line PL1 extending from the pressure header 32. A sleeve 54 is positioned in the first coupling member 50, the sleeve 54 having a circumferential array of circular ports 56 and a flange 58 extending radially from one end of the sleeve. The flange 58 engages a land 60 projecting radially inward from the first coupling member 50. The sleeve 54 supports a piston 62 of non-magnetic material for sliding between a position permitting full flow through the device and a position stopping flow. The piston 62 is a hollow cylinder, having a closed end 66, a side wall 67, an open end 68 positioned on a side of the land 60 opposite from the closed end 66, and a circumferential array of elongated slots 69 through the side wall 67 in alignment with the ports 56 of the sleeve 54. A flange 70 extends radially outward from the open end 68 of the piston 62 and a spring 72 is positioned between the land 60 and the flange 70 of the piston 62. The spring 72 biases the piston 62 into the position permitting full flow through the control device D1, holding the flange 70 in engagement with an externally threaded preloading nut 74, which is held in a desired position in the bore of the first coupling member 50 by threaded engagement with the threads 52. The preloading nut 74 is adjustable by screwing farther into or out of the first coupling member 50 to determine the full flow position of the piston 62. The length of the elongated slots 69 is sufficient to keep the slots lined up axially with the ports 56 for any anticipated installed length of the spring 72.

An end of the first coupling member 50 opposite to the end having the threads 52 includes external threads 76 for mating with internal threads 78 of a second coupling member 80. The second coupling member 80 includes a shoulder 82 which engages one end of a precisely machined annular spacer 84. The other end of the spacer 84 engages the radial flange 58 of the sleeve 54 and holds the flange fixed against the land 60. The second coupling member 80 also includes a conical machined surface defining a valve seat 86. The valve seat 86 is aligned with, but spaced from, a valve surface 88 of corresponding conical shape defined on the closed end of the piston 62. The second coupling member 80 includes a reduced diameter bore 90 defining a flow passage downstream of the valve seat 86, and the closed end 66 of the piston 62 includes an extension 92 projecting into the reduced diameter bore 90. A permanent magnet 94 is positioned in a recess defined in the extension 92. The portion of the second coupling member 80 defining the reduced diameter bore 90 has a wall 96 at least a portion of which is relatively thin and a magnetically operated switch, such as a reed switch 98, is positioned on the external side of the wall 96 in a cavity 99 in the second coupling member 80. An end of the second coupling member 80 opposite the threads 78 includes threads 100 for connecting the device D1 to a threaded portion of the pressure line PL1 leading to the bearing B1. The parts of the device D1 are made of a material, such as brass, which is non-magnetic and which is non-corrodible by petroleum-base or synthetic lubricants.

As can be appreciated from the block diagram of FIG. 3, the reed switch 98 is connected in a control circuit including, for example, a relay (not shown), which is a part of a turbine shutdown system 101 for shutting down the turbine. Thus, when the reed switch 98 is actuated, by the proximity of the permanent magnet 94, the turbine shuts down. A visual and/or audible alarm 102 in a control room can also be connected in a circuit with each reed switch to immediately tell operators what has happened.

In normal operation, lubricating oil under pressure flows from the portion of the pressure line PL1 upstream of the lubricating oil control device D1 into the first coupling member 50. As can be seen from FIG. 2, the flow continues through the interior of the piston 62, through the slots 69 and through the aligned ports 56 in the sleeve 54. The flow continues through a space between the sleeve 54 and the annular spacer 84, through the space between the valve surface 88 and the valve seat 86, around the extension 92 of the piston 62 and into the portion of the pressure line PL1 leading to the bearing B1. Due to the back pressure exerted on the fluid by the orifice at the inlet to the bearing, the flow is at relatively low velocity and the pressure of the lubricating oil flowing into the piston 62 is insufficient to overcome the bias of the spring 72, so that the flange 70 of the piston 62 is held against the preloading nut 74, and the valve surface 88 is kept spaced from the valve seat 86. In this position of the piston 62, the permanent magnet 94 is not properly positioned relative to the reed switch 98 to actuate the switch, and so the turbine runs unaffected.

In the case of a fracture or separation in the oil line PL1 downstream of the device D1, or even in the case of a serious leak, the lubricating oil will flow out of the pressure line PL1 more quickly than is normal, up to three or four times normal flow, and, thereby, will reduce the pressure downstream of the piston 62. The reduced pressure results in an increase in pressure differential between the upstream and downstream sides of the piston 62, so that the pressure of the entering lubricating oil is now sufficient to overcome the bias of the spring 72 and instantaneously move the valve surface 88 into sealing engagement with the valve seat 86, cutting off the flow of lubricating oil through the control device D1. Thus, the source of fuel feeding any fire around the downstream break in the pressure line PL1 is cut off, and the fire can be controlled. Furthermore, the movement of the piston 62 places the permanent magnet 94 in a position properly aligned with the reed switch 98 to actuate the reed switch and thereby activate the turbine shutdown system 101 (FIG. 3), shutting down the turbine. Since the turbine is shut down, the oil remaining in the bearing B1 prior to the cutoff of lubricating oil by the actuation of the device D1 may be sufficient to prevent damage to the bearing B1. As can be seen from FIG. 3, the reed switches 98 of all of the pressure devices D1-D10 can be connected to an OR gate 104, so that actuation of any one of the reed switches, in response to a break in any one of the pressure lines PL1-PL10, results in activation of the alarm 99 and the turbine shutdown system 101.

The relative positioning of the permanent magnet 94 and the reed switch 98 is preferably arranged so that the magnet 94 actuates the reed switch 98 at a suitable point between the fully open and fully closed positions of the valve surface 88 with respect to the valve seat 86. As a result, the turbine shutdown system 101 and the alarm 102 are activated when the piston 62 is only part way between its fully open position and its fully closed position. This is done in order to shut down the turbine in case a break in a line does not occur instantaneously but develops from a crack over a short period of time. This limits damage to the bearing by shutting down the turbine before lubrication to the bearing served by the leaking oil line is shut off entirely, thereby maintaining lubrication to the bearing until the turbine is rotating at as low a speed as possible.

When the turbine is tripped, an auxiliary lubricating oil pump takes over, as a part of the turbine shutdown system 101 to supply lubricating oil to the bearings. The lubricating oil is supplied by the auxiliary pump under a pressure which is somewhat less than the pressure developed by the main turbine pump. The spring 72 is designed so that, when the turbine is tripped off line by a failure in the oil pressure line PL1, the pressure under which the lubricating oil is fed by the auxiliary pump is sufficient to keep the valve surface 88 on the piston 62 in sealing engagement with the valve seat 86, overcoming the force exerted by the spring 72 on the piston 62 in the opposite direction. In the event of a surge of overpressure, up to the peak discharge pressure of the lubricating oil pump, during normal operation, the piston 62 will not move toward the closed position, even partially, by virtue of the pre-established preload in the spring 72. The spring 72 is never moved in the normal operation of the control device D1 and, therefore, the spring cannot fail in fatigue, which is the usual mode of failure of mechanisms in normal operation. If the spring 72 does become weakened, through corrosion, erosion or some other mechanism, the weakened spring 72 will allow the piston 62 to move to a position in which the permanent magnet 94 actuates the reed switch 98 to trip the turbine shutdown system 101 and annunciate the alarm 102 in the control room before the supply of lubricating oil is completely shut off to the bearing B1 associated with the oil pressure line PL1 containing the control device D1. Furthermore, if the ports 56 in the sleeve 54 begin to plug gradually, from silt or dirt in the lubricating oil, the piston 62 will move to actuate the reed switch 98, trip the turbine shutdown system 101, and annunciate an alarm 102 before the lubricating oil to the bearing B1 is shut off completely, again by virtue of the positioning of the reed switch 98 relative to the permanent magnet 94. The actuation of the reed switch 98 of any of the lubricating oil control devices D1-D10 instantaneously trips the turbine off line through the activation of the turbine shutdown system 101 and also activates the alarm 102.

Although the lubricating oil fire control devices according to the present invention have been described in connection with a steam turbine and generator, it is understood that they can be used in connection with other machinery having force fed lubrication and environments which present the potential for a lubricating oil fire in case of a leak. In addition, the fire control devices according to the present invention can be used in connection with the pressure feeding of other flammable fluids, such as hydraulic fluid, to machinery. Although one embodiment of the control device according to the present invention has been particularly described herein, it is intended that various modifications can be made without departing from the spirit and scope of the present invention, which is defined in the appended claims.

I claim:

1. Apparatus for controlling lubricating oil fires around a machine having bearings to which lubricating oil is fed under pressure through at least one conduit, comprising:

means mounted in said conduit for stopping the flow of lubricating oil through the conduit in response to a greater than normal flow of oil through said conduit downstream of said flow stopping means, said flow stopping means comprising a valve seat and a valve element movable from a first position spaced from said valve seat to a second position engaging said valve seat; and means associated with said flow stopping means for shutting down the machine in response to said valve element moving at least part way from said first position to said second position, whereby the flow of lubricating oil is stopped and the machine is shut down when there is a break in the conduit.

2. The apparatus according to claim 1, wherein said shutting down means comprising a circuit for controlling the shutting down of the machine, an element in the circuit for activating the circuit for shutting down the machine, and means connected to said valve element for actuating said element in the circuit.

3. The apparatus according to claim 2, wherein said element in the circuit is a magnetically operated switch, and said means for actuating said element is a magnet.

4. The apparatus according to claim 3, wherein said magnetically operated switch is a reed switch.

5. The apparatus according to claim 1, further comprising an alarm for indicated said moving of said valve element at least part way from said first position to said second position.

6. The apparatus according to claim 1, wherein said lubricating oil flow stopping means comprises a coupling for connecting two portions of the lubricating oil conduit.

7. The apparatus according to claim 1, wherein said flow stopping means further comprises means for supporting said valve element for movement from said first position to said second position.

8. Apparatus for controlling lubricating oil fires around a machine having bearings to which lubricating oil if fed under pressure through at least one conduit, comprising:

means mounted in said conduit for stopping the flow of lubricating oil through the conduit in response to a greater than normal flow of oil through said conduit downstream of said flow stopping means, said flow stopping means comprising a valve seat, a valve element movable from a first position spaced from said valve seat to a second position engaging said valve seat, and means for supporting said valve element for movement from said first position to said second position; and means associated with said flow stopping means for shutting down the machine in response to said valve element moving at least part way from said first position to said second position, whereby the flow of lubricating oil is stopped and the machine is shut down when there is a break in the conduit, wherein said valve element is a hollow piston having an open end, a closed end, a side wall, and at least one slot extending through said side wall, and said means for supporting said valve element comprises a sleeve having at least one port, said port being in alignment with said slot in the side wall of the piston, and said first coupling member defining an annular space around said sleeve.

9. The apparatus according to claim 6, wherein said coupling includes a first coupling member and a second coupling member secured to said first coupling member, said first coupling member having means for supporting said valve element for movement from said first position to said second position, and said second coupling member defining said valve seat.

10. The apparatus according to claim 1, wherein said flow stopping means comprises means for biasing said valve element to said first position.

11. The apparatus according to claim 10, wherein said flow stopping means further comprises adjustable means for determining said first position.

12. The apparatus according to claim 11, wherein said adjustable means for determining said first position comprises a preloading nut.

13. Apparatus for controlling lubricating oil fires around a machine having bearings to which lubricating oil is fed under pressure through at least one conduit, comprising:

means mounted in said conduit for stopping the flow of lubricating oil through the conduit in response to a greater than normal flow of oil through said conduit downstream of said flow stopping means, said flow stopping means comprising a valve seat, a valve element movable from a first position spaced from said valve seat to a second position engaging said valve seat, and a coupling for connecting two portions of the lubricating oil conduit, said coupling including a first coupling member and a second coupling member secured to said first coupling member, said first coupling member having means for supporting said valve element for movement from said first position to said second position, and said second coupling member defining said valve seat; and means associated with said flow stopping means for shutting down the machine in response to said valve element moving at least part way from said first position to said second position, whereby the flow of lubricating oil is stopped and the machine is shut down when there is a break in the conduit, wherein said means for shutting down said machine comprises a magnetically operated switch mounted on said second coupling member.

14. The apparatus according to claim 3, further comprising a flow passage and a cavity external to said flow passage, said magnetically operated switch being positioned in said cavity.

15. The apparatus according to claim 14, wherein said means for shutting down said machine further comprises a magnet mounted on said valve element, said magnet being located in said flow passage adjacent to said magnetically operated switch.

16. The apparatus according to claim 1, wherein lubricating oil is fed under pressure to the bearings through a plurality of conduits, each of said conduits feeding one bearing different from the bearings fed by any of the other conduits, and said means for stopping the flow of lubricating oil comprises a valve element and a valve seat mounted in each of said conduits, each said valve element being movable from a first position spaced from its associated valve seat to a second position engaging its valve seat in response to greater than normal flow of oil through its associated conduit downstream of the valve seat, whereby the flow of lubricating oil is stopped only to a bearing fed by a conduit in which a break occurs.

17. The apparatus according to claim 16, wherein said means for shutting down the machine comprises means for shutting down the machinery in response to any of said valve elements moving at least part way from its first position to its second position.

18. The apparatus according to claim 16, further comprising an alarm for indicating the moving of any of said valve elements at least part way from its first position to its second position.

19. A device for controlling lubricating oil fires around a machine having bearings to which lubricating oil is fed under pressure through at least one conduit, comprising:

a valve body mountable in the conduit, said valve body defining a flow passage for the lubricating oil and a valve seat around the flow passage, whereby the flow of lubricating oil through the device is stopped;

a hollow valve element having an open end, a closed end, a side wall, at least one slot defined in the side wall, and a valve surface defined on the closed end;

means for supporting said valve element for movement from a first position in which said valve surface on said valve element is spaced from said valve seat to a second position in which said valve surface engages said valve seat, said supporting means comprising a sleeve having at least one port in alignment with the slot in the side wall of the valve element;

means for biasing said valve element to said first position, said biasing means holding said valve element in said first position during normal flow of lubricating oil through said flow passage and allowing said valve element to move to said second position in response to greater than normal flow through said flow passage, whereby the flow of lubricating oil through the device is stopped;

a circuit element mounted adjacent and external to said flow passage, said circuit element being connectable to a circuit for shutting down the machine; and means mounted on said valve element for actuating said circuit element in response to said valve surface moving at least part way between said first position and said second position.

20. A method for controlling flammable fluid fires around a machine having bearings to which flammable fluid is fed under pressure through at least one conduit, comprising:

stopping the flow of flammable fluid through the conduit in response to greater than normal flow of fluid through the conduit; and shutting down the machine to which the flammable fluid is being fed when the flow of flammable fluid is reduced.

21. The method according to claim 20, further comprising activating an alarm when the machine is being shut down.

22. The method according to claim 20, wherein the flammable fluid is fed to the bearings through a plurality of conduits, each conduit feeding one bearing different from teh bearings fed by any of the other conduits, and the step of stopping the flow of flammable fluid comprises stopping the flow of flammable fluid in any of the conduits in response to a greater than normal flow of flammable fluid through that conduit.

23. The method according to claim 22, wherein the step of shutting down the machine comprises shutting down the machine when the flow of flammable fluid through any one of the conduits is reduced.

24. In a machine having a plurality of bearings to which lubricating oil is fed under pressure, the improvement comprising:

a plurality of lubricating oil conduits feeding the lubricating oil to the bearings, each said conduit feeding a bearing different from the bearings fed by any other of said conduits;

means mounted in each said conduit for stopping the flow of lubricating oil through said conduit in response to a greater than normal flow of oil through said conduit downstream of said flow stopping means, said flow stopping means comprising a valve element and a valve seat, each said valve element being movable from a first position spaced from its associated valve seat to a second position engaging its valve seat in response to greater than normal flow of oil through its associated conduit downstream of the valve seat; and means associated with said flow stopping means for shutting down the machine in response to any said valve element moving at least part way from said first position to said second position, whereby the flow of lubricating oil is stopped only to a bearing fed by a conduit in which a break occurs, and the machine is shut down when there is a break in any of said conduits.

* * * * *